July 18, 1950
D. H. BANGHAM ET AL
2,515,545
METHOD OF AND APPARATUS FOR CONTROLLING THE COMBUSTION RATE AND COMPOSITION OF THE COMBUSTION GASES IN THE BURNING OF SOLID FUEL
Filed Oct. 27, 1943
5 Sheets-Sheet 1
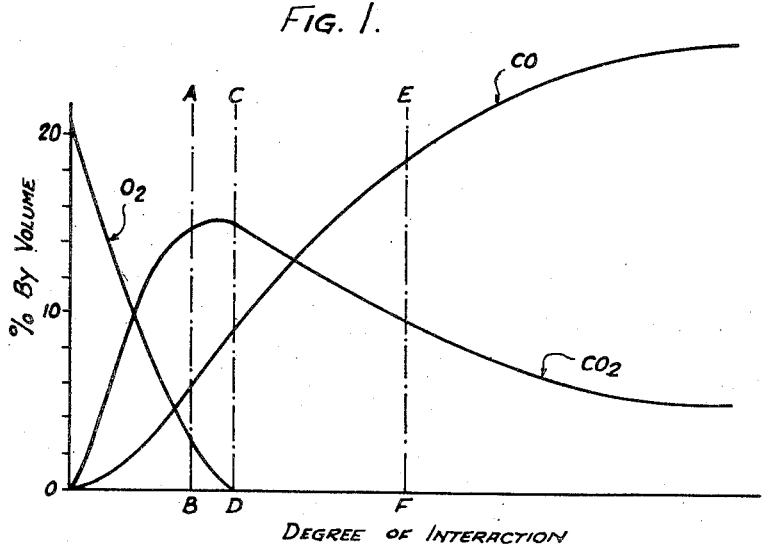
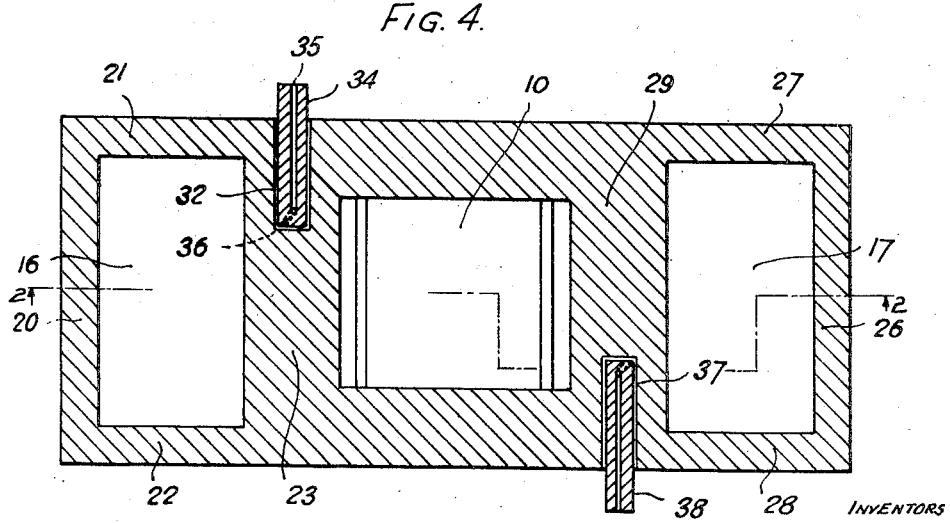

July 18, 1950  D. H. BANGHAM ET AL  2,515,545
METHOD OF AND APPARATUS FOR CONTROLLING THE COMBUSTION
RATE AND COMPOSITION OF THE COMBUSTION GASES IN
THE BURNING OF SOLID FUEL
Filed Oct. 27, 1943  5 Sheets-Sheet 2
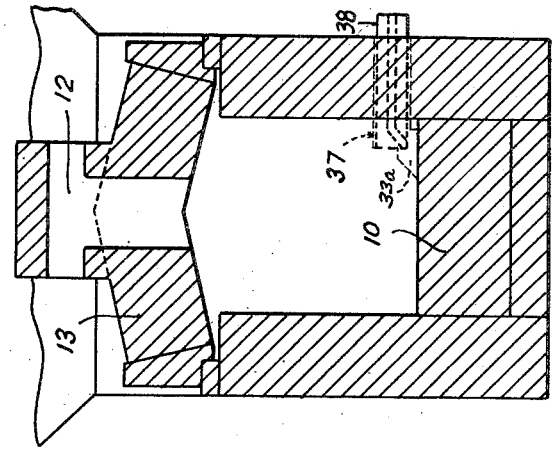
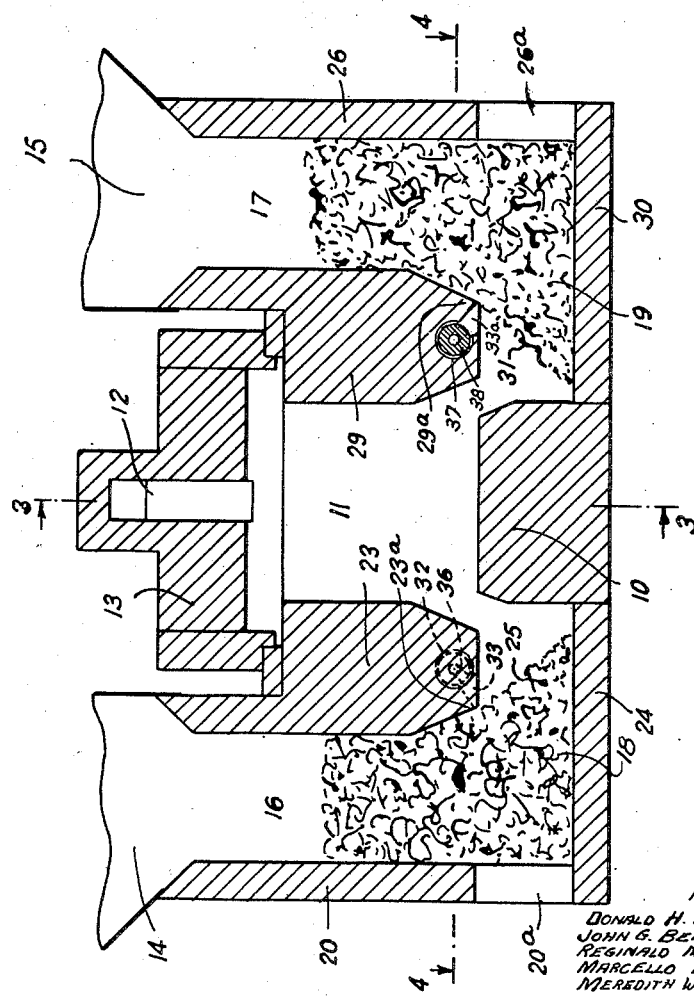
INVENTORS
DONALD H. BANGHAM
JOHN G. BENNETT
REGINALD MAYORCAS
MARCELLO PIRANI
MEREDITH W. THRING
William P. Hall
ATTORNEY

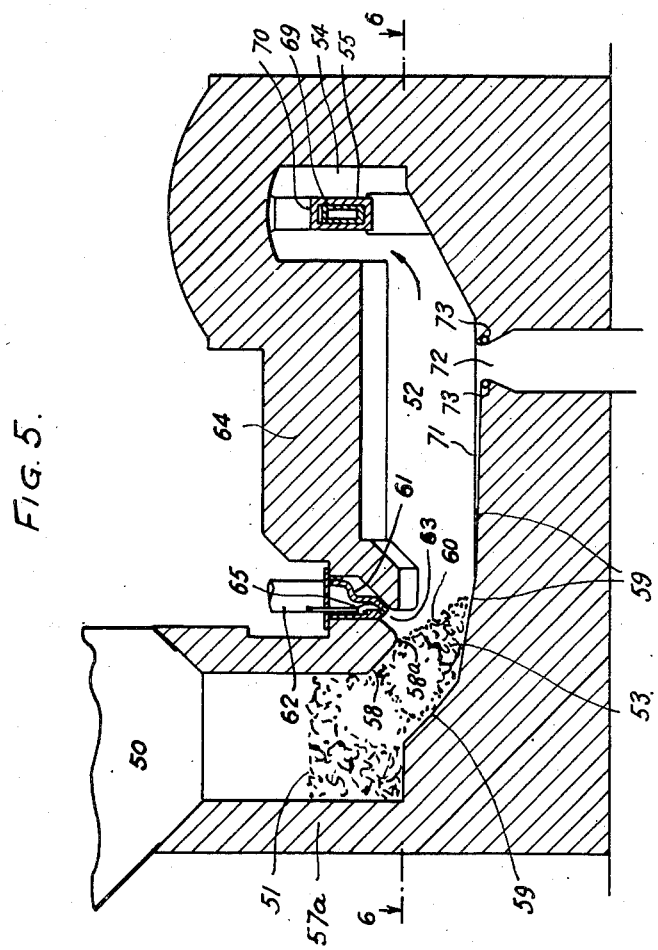

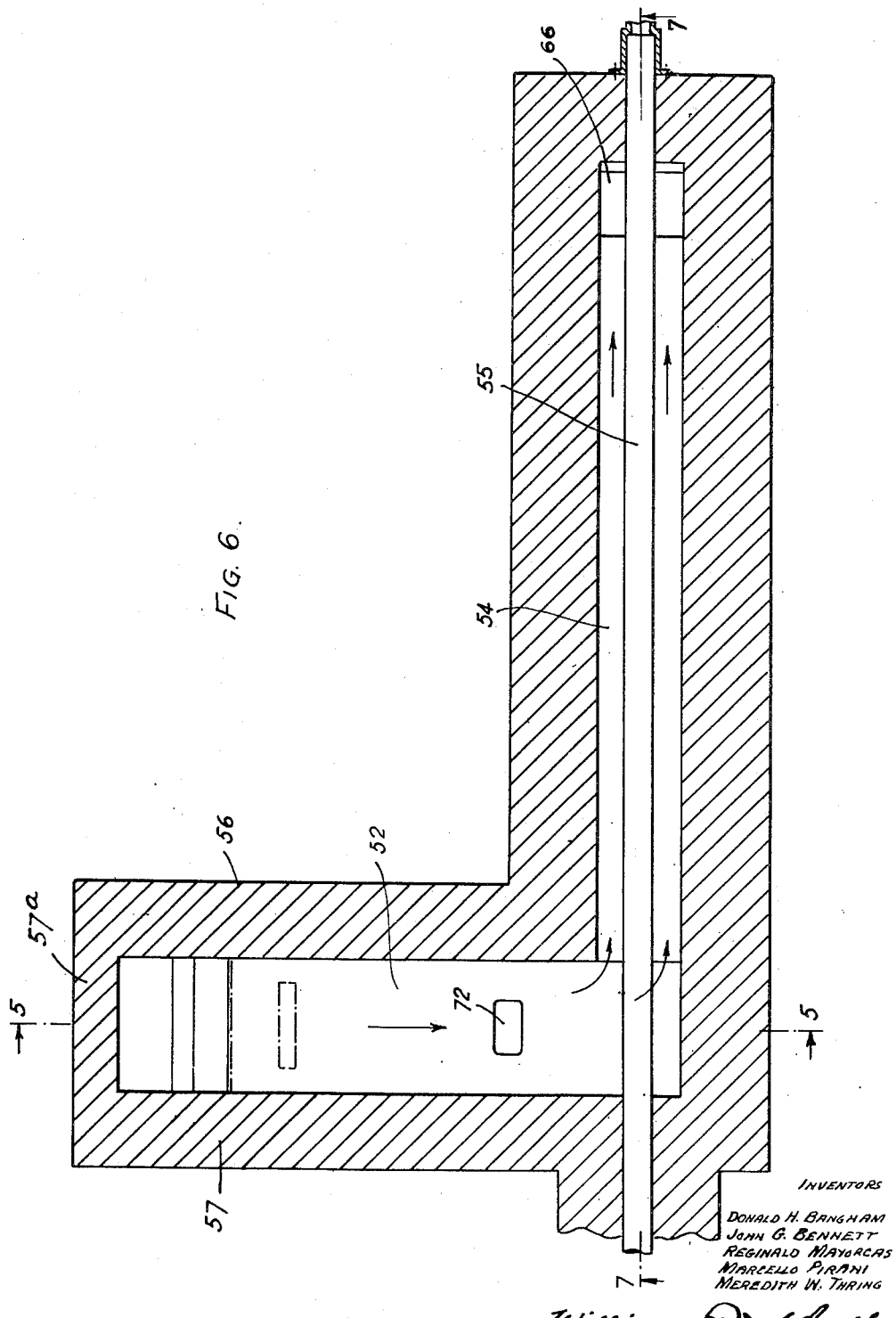

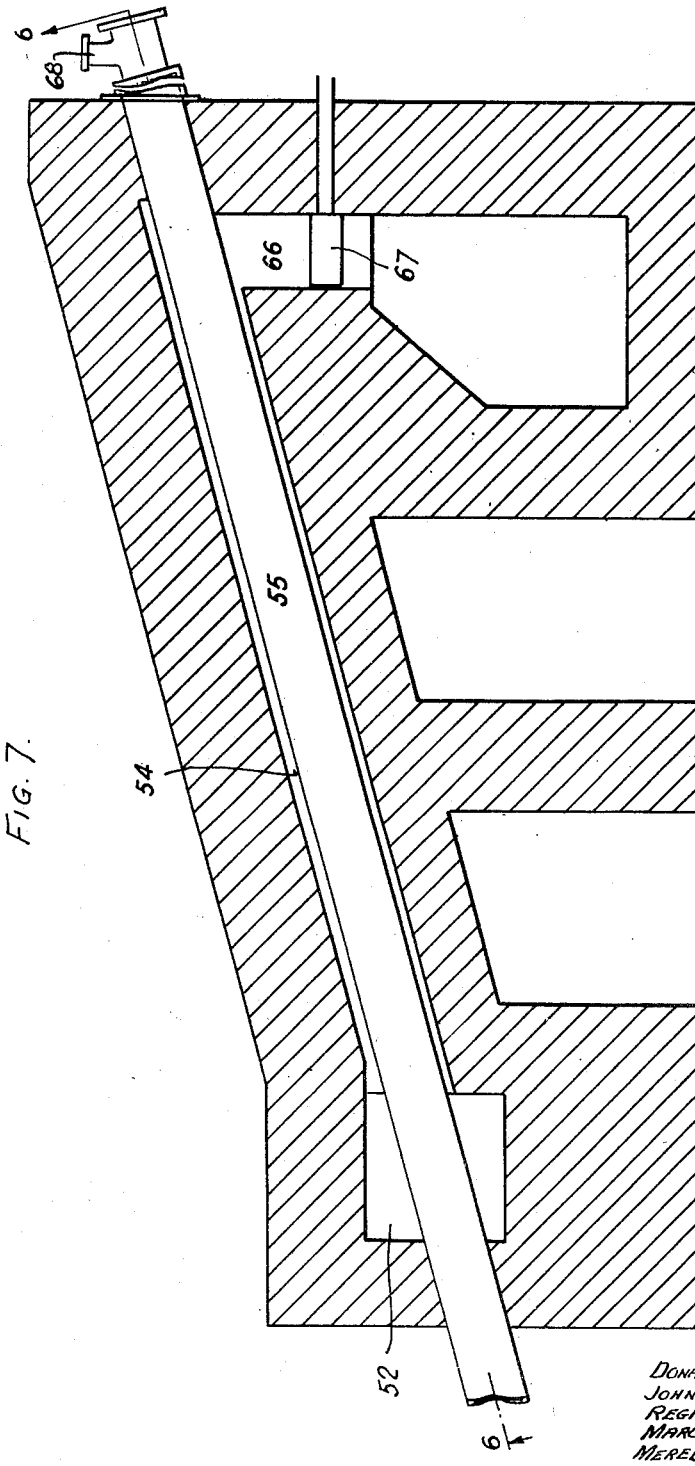

Patented July 18, 1950

2,515,545

UNITED STATES PATENT OFFICE 2,515,545

METHOD OF AND APPARATUS FOR CONTROLLING THE COMBUSTION RATE AND COMPOSITION OF THE COMBUSTION GASES IN THE BURNING OF SOLID FUEL

Donald Hugh Bangham, London, John Godolphin Bennett, New Malden, Reginald Mayorcas, London, Marcello Pirani, Kingston Hill, and Meredith Wooldridge Thring, London, England, assignors to C. U. R. A. Patents Limited, London, England Application October 27, 1943, Serial No. 507,850
In Great Britain October 28, 1942

19 Claims. (Cl. 110—75)

In the production of heat by the combustion of coke or other solid carbonaceous fuel in furnaces and the like the air for the combustion of the fuel is usually introduced through inlets which are in contact with the fuel such as apertures in the grate of the fuel bed or in the side walls, the air so introduced being termed "primary air."

In its passage through the fuel bed the air interacts with the fuel to produce a mixture of gases the composition of which depends on, and is indicative of, a quantity which is referred to herein as the "degree of interaction." The degree of interaction, assuming uniform packing, depends primarily on the distance of travel of the gases through the fuel measured in terms of fuel particle diameters, so that, generally speaking, the same degree of interaction is attained after a given number of particle diameters have been traversed. The degree of interaction also depends to a slight extent on the temperature of the air entering the fuel bed and on the reactivity of the fuel. The change in the percentage composition by volume of the gases as the degree of interaction increases is shown in the graph in Figure 1 in the case of fuels whose combustible content consists substantially wholly of carbon.

The change can be conveniently explained by taking as examples two stages. The first stage is reached after the relatively small degree of interaction shown by the dotted line A—B, when the gas contains a large quantity of carbon dioxide together with a small amount of carbon monoxide, and just sufficient unconsumed oxygen to burn the carbon monoxide if the gases could be removed at this stage and the gas reaction completed. In that case complete conversion of the oxygen into carbon dioxide would be brought about so as to give a combustion gas containing substantially 21 per cent of carbon dioxide, and in this way the maximum liberation of heat would be obtained. As the degree of interaction increases beyond this first stage, the second stage is reached when the oxygen is all consumed, as shown at C—D. If the gases could be removed at this stage, the proportion of carbon dioxide would be about 14–16 per cent and the proportion of carbon monoxide about 8–12 per cent. From the second stage onwards the proportion of carbon dioxide falls and that of carbon monoxide rises.

With fuels containing other combustibles, such as hydrogen and sulphur, in addition to carbon, it will be understood that the percentages of carbon dioxide and carbon monoxide for any given degree of interaction will be reduced, partly because some of the available oxygen is consumed in burning other combustibles, and partly because of the distillation of volatile combustibles from the fuel. Accordingly, for any such fuel there will be a degree of interaction corresponding to that indicated by the line A—B at which the gases contain, in addition to carbon dioxide and other fully burnt products of combustion, just sufficient oxygen to burn the carbon monoxide and other combustible products.

With the usual method of combustion, however, it would not be possible to obtain in the gases issuing from the fuel the compositions represented by the lines A—B and C—D, because the beds of fuel required would be so shallow as to give rise to excessive irregularities of gas flow and to overheating of metal structures in contact with the fuel. Hence the gases leaving the fuel bed of normal thickness, which gives a degree of interaction represented by the line E—F for example, always have a substantial content of combustible products, mainly carbon monoxide.

Consequently, in order to burn these combustible products it is usual to introduce "secondary air" above the grate either directly or by leakage round the grate. The normal method of combustion therefore involves three stages of burning, the first two stages occurring in the fuel bed and consisting in the production of preponderating amounts of carbon dioxide followed by the reduction of carbon dioxide to carbon monoxide, and the third consisting in the combustion of carbon monoxide to carbon dioxide by means of secondary air outside the fuel bed. Moreover, the secondary air must be substantially in excess of the theoretical quantity, owing to the difficulty of obtaining efficient mixing of the secondary air with the gases. For these reasons it is rarely practicable to work with conditions giving more than about 14 per cent of carbon dioxide in the final gases; and, since by this dilution the temperature of the combustion gases is lowered, it is difficult to obtain temperatures exceeding about 1400° C. Even in cases where, as in the practice of steam raising, it is not necessary that the combustion gases should attain very high temperatures, there is diminished efficiency, because a part of the sensible heat absorbed by the excess air is carried through to the stack and is lost, and heat transfer is adversely affected. Furthermore, it is necessary to provide a relatively large combustion space outside the fuel bed to burn the large quantity of carbon monoxide present.

Again, because of disturbances resulting from fuel packing, segregation, caking, clinkering, and other factors, it is difficult and indeed often impossible in the normal methods of firing to maintain a desired degree of interaction, even when for this purpose variations are made in the depth of the fuel bed. Furthermore, if it is attempted to attain in the fuel bed temperatures so high as to cause ash fusion, the air inlets are liable to become obstructed by clinker.

The present invention is based on the observation that it is possible to control at will the composition of the combustion gases, and correspondingly the degree of interaction, independently of and simultaneously with the rate of heat release by controlling the rate of supply of the air for combustion and by directing the said air in the form of a jet on to a free surface of a stable bed of fuel arranged and supported to ensure emergence of combustion gases from the same free surface, and by so controlling the mean penetration of the jet into the fuel bed that the desired composition of combustion gases at or near the fuel surface is secured for the desired rate of air supply, which latter determines the rate of heat release for the desired composition of the combustion gases.

The expression "stable bed of fuel" is used herein to denote a substantially quiescent bed of fuel but contemplates some little movement relative to one another of the fuel particles in the combustion zone resulting from the process of combustion thereat or from the supply of fresh fuel particles thereto.

By this method of operation it is possible so to control the mean penetration of the jet into the fuel bed that for the desired rate of air supply the combustion gases at or near the fuel surface contain oxygen and combustible products in proportions relatively to one another requisite for their substantially complete conversion into fully burnt products of combustion. Such a composition of the combustion gases is therefore of the kind corresponding to the degree of interaction represented by the line A—B in Figure 1, and leads to a maximum liberation of heat for the desired rate of air supply, when the reaction is completed outside the fuel surface so as to produce final combustion gases having a content of carbon dioxide and other fully burnt products approaching the theoretical maximum for the fuel being burned. In this way temperatures above 1400° C. and as high as 1800° C. can be attained without preheating the air.

In order to increase the temperature still further the air may be enriched with oxygen or oxygen itself may be used; and it is to be understood that the term "air" is used herein where the context permits to include oxygen alone or air enriched with oxygen.

It may also be desirable to preheat the air before it is introduced. By such preheating even higher temperatures than those indicated above can be obtained. Whereas in the normal methods of firing preheating leads to the formation of more carbon monoxide in the gases evolved from the fuel bed, in the new method the desired high content of fully burnt products can be maintained notwithstanding the preheating by suitably adjusting the degree of interaction. A further advantage of the new method is that a much higher degree of preheat can be used than the preheating to only about 200° C. which is permissible, if combustion difficulties and expensive grate maintenance are to be avoided when the air is introduced beneath the grate of the fuel bed.

Although the new method is of particular value for attaining high temperatures by controlling the composition of the combustion gases in the manner described above, it is also possible so to control the mean penetration for the desired rate of air supply that the combustion gases contain combustible products and a proportion of oxygen in excess of that required for substantially complete conversion of the combustible products into fully burnt products, or that the combustion gases contain a proportion of combustible products such that the said products cannot in the conditions prevailing be substantially completely converted into fully burnt products. A composition of combustion gases containing an excess of oxygen as stated in the former case is therefore of the kind corresponding to a degree of interaction represented by a line to the left of the line A—B in Figure 1, and a composition containing a proportion of combustible products as stated in the latter case is of the kind corresponding to a degree of interaction represented by a line to the right of the line A—B.

It will be understood that the whole of the jet of air does not penetrate to a uniform degree into the fuel bed, so that some portions of the air will penetrate to a greater degree than other portions, and indeed some of the air may not enter the fuel bed, in which case the degree of penetration is zero. The expression "mean penetration" is therefore used herein to denote the average of all such degrees of penetration, and the "composition of the combustion gases at or near the fuel surface" means the overall composition of the gas resulting from the said mean penetration, which gas may contain fully burnt products of combustion, combustible products and free oxygen. The attainment of the appropriate mean penetration in any particular case can readily be determined from an examination of the composition of the combustion gases.

The control of the mean penetration may be accomplished by adjustment of the mode of impingement of the jetted air against the fuel surface, as by adjusting, while maintaining the desired rate of air supply, the velocity of the air jet or the angle at which the jet strikes the fuel surface, an increase in the mean penetration being obtained by increasing the velocity or by increasing the angle between the jet and the fuel surface, that is to say by bringing the angle nearer to normal to the fuel surface. This control may, of course, be accomplished by adjusting both the velocity and the angle.

The velocity and/or the angle may therefore be adjusted so as to secure a mean penetration yielding combustion gases containing quantities of combustible products and oxygen requisite for their substantially complete combustion as stated above. A lower velocity and/or a smaller angle (that is to say an angle further from normal to the fuel surface) will give a lower mean penetration such that the combustion gases contain an excess of oxygen. Such condition may be used when gases having oxidising properties are desired. On the other hand, a higher velocity and/or a greater angle will increase the mean penetration so that the combustion gases contain a proportion of combustible products such that the said products cannot be substantially completely converted into fully burnt products. Such conditions may be used when gases having reducing properties are desired.

By the new method it is possible to regulate the composition of the combustion gases as desired during combustion with a facility similar to that of a gas burner, for example a Bunsen burner, having separate air and gas valves to regulate the composition of the air-gas mixture to be burned. Thus, for example, with any given angle from 90° to about 15° of the jet of air to the fuel surface it is possible by adjusting the air velocity to obtain any desired composition of combustion gases over a wide range with any predetermined rate of air supply between the maximum and one tenth of the maximum. Similarly, with any given velocity between say 30 and 100 feet per second the composition of the combustion gases can be varied in like manner over the same range of rates of air supply by adjusting the angle from 90° to about 15°.

The new method of combustion can be used with any solid carbonaceous fuel, for example, metallurgical and gas coke, anthracite, non-caking or caking bituminous coal, wood, peat or charcoal.

The method is generally applicable to all types of furnaces and like heating appliances in which solid carbonaceous fuel is burned to yield gaseous products of combustion which are channelled for heating, or other use, in furnace passages, as combustion chambers and flues, before being exposed to the open atmosphere, for example, muffle or crucible furnaces, open hearth furnaces, reheating furnaces, heat treatment furnaces, calcining furnaces, furnaces for firing boilers including water tube boilers, fire tube boilers, hot water supply and central heating boilers, and closed stoves.

Accordingly, the invention also includes a furnace or like heating appliance adapted for carrying out the method described above, which comprises the combination of a hearth or fuel supporting means adapted to support and form a stable bed of fuel having a free surface with air inlet means so disposed and arranged as to enable air for combustion to be directed at a controllable rate of supply in the form of a jet on to the said free surface and the mean penetration of the jet into fuel bed to be controlled, the combination being such that combustion gases emerge from the same free surface. For the latter purpose the fuel supporting means may be so constructed that gases are constrained to emerge from the same free surface either by the resistance of the fuel due to the volume of the fuel bed or by virtue of the boundaries of the fuel supporting means being gas tight.

By so constructing the fuel supporting means that the fuel bed which it accommodates is of adequate volume, the boundaries of the fuel supporting means, such as the walls, floor and, if present, the grate, can be kept out of contact with the zone of combustion, the latter being enclosed by a region of unburnt fuel whereby the said boundaries are protected.

Owing to the fact that the air is directed in the form of a jet on to the fuel surface, the air inlet is disposed out of contact with the fuel and its incombustible residue. Consequently, there is considerable freedom both in the choice of materials for the construction of the air inlet and in the arrangements for the removal of ash, which may be removed in clinker or liquid form. Moreover, as the path of the ash is distinct from the path of the gas, it is unnecessary to take the latter into account in the design of the arrangements for ash removal. When, for example, it is desired to arrange for the removal of ash in liquid form, the fuel supporting means may be adapted to form a fuel bed having a free surface inclined at the angle of repose of the fuel, and may have a floor extension such that the liquid ash can flow from the bottom of the fuel bed to the place of discharge in contact with hot gas, whereby the ash is maintained in liquid condition until it is discharged.

For the purpose of securing the desired composition of combustion gases for the desired rate of air supply the air inlet means may be such as to enable the mean penetration to be controlled by adjusting, without alteration of the rate of air supply, the velocity of the jet and/or the angle at which it strikes the fuel surface. For adjusting the velocity the air inlet means may comprise a device for varying the effective cross sectional area of the inlet opening, for example, an adjustable valve for partially obstructing the opening. For adjusting the angle the air inlet means may comprise an inlet capable of angular adjustment to vary the angle which the axis of its opening forms with the fuel surface. For this purpose the inlet may be formed in a rotatable member with the axis of the opening extending at an angle to the axis of rotation. Such adjustment of the velocity and/or the angle can be made during combustion in order to counteract any change in conditions which would tend to alter the composition of the combustion gases.

It will be understood that two or more air inlets may be provided, each directing air on to a different part of the same fuel surface or on to separate fuel surfaces disposed at different parts of the appliance. The opening of the air inlet or inlets may be of any desired shape, for example, round or elongated in the form of a slit; and it will be understood that the word "jet" is used herein to include a stream of air in the form of a thin band such as is produced by a slit shaped inlet opening.

The fuel supporting means may take the form of a space bounded by side walls and a horizontal or inclined floor to support the fuel and having a lateral opening through which a limited amount of fuel can emerge on to an extension of the floor and form under gravity a fuel bed having a free surface inclined at the angle of repose of the fuel. The air inlet may be arranged in a wall bounding the top of the combustion space outside the free surface of the fuel with the axis of the inlet opening directed downwardly towards the free surface. In order that the fuel bed shall be constantly renewed during combustion the fuel may be fed into the fuel supporting means mechanically or by gravity from a hopper.

In the case of a furnace the object to be heated, for example, a crucible or muffle, may be situated in the combustion space outside the fuel surface at any convenient position therein. The gases have a natural tendency to spread out in their passage through the fuel bed from the place of entry to that of emergence, and this tendency may lead to a material difference in the composition of the gases emerging from different parts of the fuel surface and travelling through different regions of the combustion space. This stratification of the gases may advantageously be utilised to produce a localised zone of high temperature at a selected part of the combustion space, for example, by providing at an appropriate position deflecting means to assist the mixing of the gases. If, on the other hand, such deferred mixing of the gases is not desired use may be made of an expedient to counteract the natural tendency for stratification to occur, such as, for example, deflecting means provided within or at a boundary of the fuel bed to interfere with the natural gas flow therein.

Furnaces constructed in accordance with the invention are illustrated in Figs. 2 to 7 of the accompanying drawings, in which:

Figure 1 is a graphic showing of the percentage composition by volume of the gases as the degree of interaction increases, in the case of fuels whose combustible content consists substantially wholly of carbon.

Figure 2 shows in vertical cross section taken on the line 2—2 in Fig. 4 a coke fired crucible furnace having a pair of angularly adjustable air nozzles, Figure 3 is a vertical section taken on the line 3—3 in Figure 2, Figure 4 is a horizontal section taken on the line 4—4 in Figure 2, Figure 5 shows in vertical cross section a coke fired muffle furnace having a slit-shaped air inlet of variable opening, Figure 6 is a horizontal section taken on the line 6—6 in Figure 5, and Figure 7 is a vertical section taken on the line 7—7 in Figure 6.

In the construction of crucible furnace shown in Figs. 2-4 the crucible (not shown) is placed on a central support 10 within the combustion space 11 through which the combustion gases pass upwardly through the flue 12 in the roof 13 of the furnace. Two gas-tight fuel hoppers 14 and 15 are provided, one on each side of the central combustion space, to feed coke under gravity down vertical shafts 16 and 17 to the fuel beds 18 and 19, respectively. The shaft 16 is bounded at the sides by the end wall 20, side walls 21 and 22, and internal wall 23, and at the bottom by the floor 24. A lateral opening bounded at the top by the lower edge 23a of the internal wall 23 and at the bottom by the floor 24 permits a limited amount of coke to emerge from the shaft 16 on to the extension of the floor 24 beyond the said opening, so that the fuel bed 18 is formed under gravity, having a free surface 25 inclined at the angle of repose of the fuel. Similarly, the shaft 17 is bounded by the end wall 26, side walls 27 and 28, internal wall 29 and floor 30, and has a lateral opening between the lower edge 29a and the floor 30 to form the fuel bed 19 having a free surface 31. In the lower part of the walls 20 and 26 are openings 20a and 26a, respectively, for ash removal, these openings being normally closed.

Near the base of the internal wall 23 is a horizontal cylindrical hole 32 extending from the exterior of the furnace to a depth of about one third of the width of the furnace, and having a flared extension 33 which opens into the combustion space above the surface of the fuel bed at one side of the latter, that is to say the lefthand side with respect to Fig. 3 (although the hole 32 is not shown in Fig. 3. The hole 32 receives a rotatable nozzle 34 (see Fig. 4) having an axial air conduit 35 leading at its inner end to the nozzle opening 36 whose axis extends transversely to the axis of the nozzle at an angle of about 45°. The nozzle opening 36 directs air issuing therefrom through the flared opening 33 on to the fuel surface 25, and by rotating the nozzle 34 the angle at which the air strikes the fuel surface can be varied. Near the base of the other internal wall 29 is provided a similar cylindrical hole 37 to receive a rotatable nozzle 38 of similar construction, the hole 37 being on the opposite side of the furnace, that is to say the righthand side as shown in Fig. 3, and having a flared opening 33a. It will be seen that the nozzle openings direct the air for combustion downwardly on to the respective free surfaces of the fuel beds tangentially with respect to the central combustion space 11 so that the combustion gases ascend in a helical path through the said space and round the crucible on the support 10.

In operating the above crucible furnace the composition of the combustion gases is controlled by adjusting the angle of the axes of the nozzle openings with respect to the free surfaces of the fuel beds. The rate of air supply is so controlled as to give the desired rate of heat release for the selected composition of the combustion gases. Although the mean penetration of the jet depends on the velocity of the jet and its angle with respect to the fuel surface, the mean penetration is controlled by adjusting the angle so that any variation in velocity which accompanies a change in the rate of air supply will not lead to an alteration in the mean penetration. For satisfactory operation a minimum velocity of about 75 feet per second will generally be required for satisfactory operation.

The muffle furnace shown in Figs. 5-7 comprises a gas tight fuel hopper 50 leading to a vertical shaft 51, a combustion space or passage consisting of an off-take region 52 and a heating space 54 extending at right angles to the off-take region 52, and an inclined tubular muffle 55 arranged within the heating space 54. At its lower end the shaft 51 is bounded by side walls 56 and 57, an end wall 57a, an internal wall 58 and a floor 59. A lateral opening bounded at the top by the lower edge 58a of the wall 58 and at the bottom by the floor 59 enables the fuel to form the fuel bed 53 having a free surface 60 in the manner described in connection with Figs. 2-4. The air inlet consists of an elongated casing 61 connected at the top to an air supply pipe 62 and having at the bottom a slit-shaped opening 63. The casing 61 is housed within an opening in the furnace roof 64, and the casing and its slit 63 extend at right angles to the axis of the off-take region 52. The axis of the slit is inclined to the vertical at an angle of about 45°, and the effective width of the slit opening can be varied by means of a vertically adjustable valve 65 extending across the inside of the slit. The air is directed downwardly on to the free surface 60 of the fuel bed 59, and the composition of the combustion gases for a predetermined rate of air supply is controlled by adjusting the air velocity by means of the valve 65. If the adjustment in the effective width of the slit opening is such as would lead to an alteration in the rate of air supply this can be avoided by maintaining the pressure of the air in the supply pipe constant in known manner.

The combustion gases issuing from the free surface 60 pass in the direction of the arrows shown in Figs. 5 and 6 along the off-take region 52 and heating space 54, extending at right angles to the off-take region. Owing to the spreading of the gases in their passage through the fuel bed, the gases issuing near the bottom of the fuel surface 60 will differ in composition from those emerging nearer the top of the said surface, as hereinbefore explained. Thus, the gases passing along the off-take region 52 will be stratified into upper layers containing an excess of free oxygen and lower layers containing an excess of carbon monoxide. At the junction between the off-take region 52 and the heating space 54 the path of the gases is deflected through 90°, whereby the mixing of the stratified gas layers is considerably assisted with the result that combustion is greatly increased in the heating space 54 and a zone of high temperature is produced therein near the junction with the off-take region 52. Thereafter the gases pass out of the heating space 54 into a flue 66 controlled by a damper 67.

Objects to be heated are passed continuously through the inclined tubular muffle 55 from the upper to the lower end thereof. Owing to the very high temperatures obtainable with the above muffle furnace it is especially suitable for the manufacture of barium carbide. In this process briquettes composed of a mixture of barium carbonate and carbon are passed downwardly through the muffle together with a current of hydrogen which is introduced through the branch pipe 68. As stated in the aforesaid specification the muffle consists of a carbon tube 69 having an external protective sheath 70 of refractory material.

The ash flows in liquid form from the fuel bed 60 along the channel 71 in the floor 59 to an ash discharge outlet 72. By contact with the hot gas in the off-take region 52 the ash is maintained in the liquid state during its passage to the outlet 72. In order to reduce the erosive action of the liquid ash on the edges of the outlet 72 a cooling pipe 73 is provided around these edges.

As used in certain of the appended claims the term "adjustment of the mode of impingement of the jetted air" is employed to express the generic concept of adjusting one or more of the factors, as the average angle or average velocity of impingement of the air against the fuel surface, which are effective in determining the mean extent of penetration of the air into the fuel bed through the free surface.

We claim:

1. A method of burning solid, carbonaceous fuel which consists in disposing said fuel as a stable bed having a gas pervious free surface, directing to said bed all the air supplied for supporting combustion therein in the form of at least one jet of air impinging on and penetrating into the bed through said free surface, withdrawing the gaseous products of combustion from the bed through said free surface and channelling them for use, adjusting the rate of supply of the so jetted air to the said free surface to control the rate of combustion of the fuel, and adjusting the mode of impingement of the so jetted air on said free surface to control the mean extent of penetration of the jetted air through the fuel bed independently of the rate of combustion of the fuel so as to regulate the overall composition of the channelled combustion gases emerging from the said free surface.

2. A method according to claim 1 in which, for a given rate of air supply, the mode of impingement of the jetted air against the fuel bed is so adjusted that the channelled combustion gases issuing from the bed contain combustible products and a proportion of oxygen substantially equal to that required for complete conversion of the combustible products into fully burnt products, whereby the channelled combustion gases without dilution may be interacted to produce an atmosphere substantially neither oxidizing nor reducing.

3. A method according to claim 1 in which, for a given rate of air supply, the mode of impingement of the jetted air against the fuel bed is so adjusted that the combustion gases issuing from the bed contain combustible products and a proportion of oxygen in excess of that required for substantially complete conversion of the combustible products into fully burnt products, whereby the channelled combustion gases without dilution may be interacted to produce an oxidizing atmosphere.

4. A method according to claim 1 in which, for a given rate of air supply, the mode of impingement of the jetted air against the fuel bed is so adjusted that the combustion gases issuing from the bed contain combustible products and a proportion of oxygen substantially less than that required for substantially complete conversion of the combustible products into fully burnt products, whereby the channelled combustion gases without dilution may be interacted to produce a reducing atmosphere.

5. A method of burning solid carbonaceous fuel in which the fuel is disposed as a stable bed having a gas pervious free surface, in which the air for supporting combustion in said bed is directed thereto inwardly through said free surface, and in which the gaseous products of combustion issue from the bed outwardly through said free surface; particularly characterized in that the combustion gases issuing from said free surface are channelled for use, in that all the supplied combustion air is directed to said bed substantially entirely in the form of at least one air jet impinging on and penetrating into the bed through said free surface, in that the rate of combustion of the fuel is controlled by adjusting the quantity of so jetted air supplied per unit of time, and in that the overall composition of the combustion gases issuing from said free surface is controlled independently of the rate of combustion by adjusting the mode of impingement of the adjusted quantity of so jetted air against said free surface for controlling the mean extent of penetration thereof into the fuel bed.

6. A method according to claim 5, in which the extent of penetration of the jetted air into the fuel bed is controlled by adjustment of the velocity of the jetted air impinging on the free surface independently of the quantity thereof supplied in a given time.

7. A method according to claim 5, in which the extent of penetration of the jetted air into the fuel bed is controlled by adjustment of the angle at which the jetted air strikes the free surface of said fuel bed.

8. A method according to claim 5, further characterized in that the jetted air is preheated to increase the temperature of combustion, and in that the mode of impingement of the jetted air on said free surface is adjusted to limit the tendency of such preheating to increase the degree of interaction of the channelled combustion gases issuing from said bed.

9. A method according to claim 5, in which the channelled combustion gases issuing from various parts of said fuel bed differ in composition, and tend to stratify, and in which the channelled gases are deflected to break up such stratification and produce by interaction of the combustion gases a localized zone of high temperature.

10. A method of burning solid carbonaceous fuel in which the fuel is disposed as a stable bed having a gas pervious free surface, in which the air for supporting combustion in said bed is directed thereto inwardly through said free surface, and in which the gaseous products of combustion issue from the bed outwardly through said free surface; particularly characterized in that the combustion gases issuing from said free surface are channelled for use, in that the fuel is fed to said bed by gravity and maintains said free surface in a substantially fixed location at its angle of repose, in that all the air supplied for combustion is directed to said bed in the form of at least one jet impinging against and penetrating into the bed through said free surface, in that the rate of combustion of the fuel is adjusted by regulation of the rate of supply of the so jetted air, and in that the overall composition of the channelled combustion gases issuing from said free surface is adjusted by regulating independently of the rate of combustion of the fuel the mean extent of penetration of the jetted air into the fuel bed through said free surface.

11. A method according to claim 10, in which the fuel is one producing liquid combustion products at the temperature of combustion attained, and in which such liquid combustion products are removed from the said bed to a collecting region by gravity flow.

12. A method according to claim 10, in which the fuel is one producing liquid combustion products at the temperature of combustion attained, and in which such liquid combustion products are removed from the said bed by gravity flow through the lower part of said free surface and maintained in heat exchange relation to the channelled combustion gases issuing therefrom until said liquid products reach a collecting region.

13. A combination for combustion of solid carbonaceous fuel comprising a hearth, means for feeding fresh, solid fuel thereto to maintain thereon a stable combustion bed of fuel having a free surface, means forming a passage for conducting to a zone of use the combustion gases passing from said bed through said free surface, said combination including an air-jetting apparatus constituting its sole means for supplying air to maintain combustion in said bed, said air-jetting apparatus being arranged to project the combustion air against said free surface to impinge thereon and penetrate into the bed of fuel therethrough, to thus support combustion of the fuel at and adjacent to said free surface, said air-jetting apparatus comprising means for regulating the quantity of air supplied per unit of time to establish a definite rate of combustion of the fuel in the bed, and said air-jetting apparatus further comprising means for adjusting the mode of impingement of the so regulated quantity of jetted air against said free surface independently of its rate of supply to regulate the mean extent of penetration of the jetted air into the bed so as to control its course of travel therein and thereby independently control the overall composition of the combustion gases passing from said free surface through said passage to the zone of use thereof.

14. A combination according to claim 13 in which said last named adjusting means is one which adjusts the angle of impingement of the jetted air against said free surface.

15. A combination according to claim 13 in which said last named adjusting means is one which adjusts the velocity of impingement of the jetted air against said free surface.

16. Apparatus according to claim 13 particularly adapted for the combustion of solid carbonaceous fuel which, at the temperature of combustion attained, produces liquid ash, characterized in that said hearth is provided with an extension disposed to conduct a flow of liquid ash from the bottom of the fuel bed to a place of discharge, and in that said extension is so positioned relative to said passage as to maintain said flow in heat exchange relation with the combustion gases being conducted to the zone of use.

17. A combination for combustion of solid carbonaceous fuel comprising a hearth, means for continuously feeding a fresh supply of solid fuel thereto to spread thereon by gravity and thus maintain thereon a stable combustion bed of fuel having an inclined free surface, means forming a passage for conducting to a zone of use the combustion gases passing from said bed through said free surface, said combination including an air-jetting apparatus constituting its sole means for supplying air to maintain combustion in said bed, said air-jetting apparatus being arranged to project the combustion air against said free surface to impinge thereon and penetrate into the bed of fuel therethrough, to thus support combustion of the fuel at and adjacent to said free surface, said air-jetting apparatus comprising means for regulating the quantity of air supplied per unit of time to establish a definite rate of combustion of the fuel in the bed, and said air-jetting apparatus further comprising means for adjusting the mode of impingement of the jetted air against said free surface independently of its rate of supply to regulate the mean extent of penetration of the jetted air into the bed so as to control its course of travel therein and thereby control the overall composition of the combustion gases passing from said free surface through said passage to the zone of use thereof.

18. A combination according to claim 17 in which said passage is arranged to conduct said combustion gases laterally from said inclined free surface, as a smooth flow with little disturbance of stratification thereof, and in which said passage comprises means adjacent the zone of use of the gases for disturbing the stratified flow of combustion gases to cause mixing thereof and produce a localized zone of high temperature.

19. A combination for combustion of solid carbonaceous fuel comprising, a hearth, means for continuously feeding from one side of said hearth a column of fresh, broken, carbonaceous fuel the leading end of which, under the influence of gravity, forms a stable combustion bed having an inclined free surface, means forming a passage for conducting to a zone of use the combustion gases passing from said bed through said free surface, said combination including an air-jetting apparatus constituting its sole means for supplying air to maintain combustion in said bed, said air-jetting apparatus being arranged to project the combustion air against said free surface to impinge thereon and penetrate into the bed of fuel therethrough, to thus support combustion of the fuel at and adjacent to said free surface, said air-jetting apparatus comprising means for regulating the quantity of air supplied per unit of time to establish a definite rate of combustion of the fuel in the bed, and said air-jetting apparatus further comprising means for adjusting the mode of impingement of the jetted air against said free surface independently of its rate of supply to regulate the mean extent of penetration of the jetted air into the bed and its travel therein and thereby control the overall composition of the combustion gases passing from said free surface through said passage to the zone of use thereof.

DONALD HUGH BANGHAM.
JOHN GODOLPHIN BENNETT.
REGINALD MAYORCAS.
MARCELLO PIRANI.
MEREDITH WOOLDRIDGE THRING.

REFERENCES CITED

The following references are of record in the file of this patent:

UNITED STATES PATENTS

| Number | Name | Date |
|---|---|---|
| Re. 11,833 | Schneider | June 26, 1900 |
|  | Watson | Sept. 26, 1835 |
| 181,117 | Todd | Aug. 15, 1876 |
| 265,348 | Tourangin | Oct. 3, 1882 |
| 297,772 | Fell | Apr. 29, 1884 |
| 335,207 | Boileau | Feb. 2, 1886 |
| 411,760 | Dain | Sept. 24, 1889 |
| 458,037 | Peteler | Aug. 18, 1891 |
| 725,228 | Deprez | Apr. 14, 1903 |
| 726,114 | Thomson | Apr. 21, 1903 |
| 726,115 | Thomson | Apr. 21, 1903 |
| 753,673 | Creigh | Mar. 1, 1904 |
| 806,323 | Cowles | Dec. 5, 1905 |
| 838,364 | Sullivan | Dec. 11, 1906 |
| 921,612 | Jones | May 11, 1909 |
| 1,548,360 | Goff | Aug. 4, 1925 |
| 1,780,942 | Price | Nov. 11, 1930 |
| 1,820,916 | Lain | Sept. 1, 1931 |
| 2,085,201 | Richardson | June 29, 1937 |
| 2,124,447 | Ewing | July 19, 1938 |
| 2,125,517 | Nicol | Aug. 2, 1938 |

FOREIGN PATENTS

| Number | Country | Date |
|---|---|---|
| 210,419 | Great Britain | Jan. 16, 1924 |
| 240,240 | Germany | Oct. 30, 1911 |
| 298,903 | Italy | July 18, 1932 |
| 423,117 | Great Britain | Sept. 7, 1933 |
| 454,216 | Great Britain | Dec. 22, 1934 |